United States Patent [19]

Ernster

[11] Patent Number: 4,545,933
[45] Date of Patent: Oct. 8, 1985

[54] HYDROLYZED PROTEIN COMPOSITION AND PROCESS USED IN PREPARATION THEREOF

[76] Inventor: John H. Ernster, 5658 Ravenspur, Palos Verdes, Calif. 90274

[21] Appl. No.: 644,022

[22] Filed: Aug. 23, 1984

Related U.S. Application Data

[63] Continuation-in-part of Ser. No. 404,049, Aug. 2, 1982, which is a continuation-in-part of Ser. No. 179,771, Aug. 20, 1980, Pat. No. 4,363,820.

[51] Int. Cl.$^4$ .................................................. A23J 1/20
[52] U.S. Cl. ...................................... 260/119; 260/120; 426/332; 426/407; 426/643; 426/652; 426/657
[58] Field of Search .............................. 260/120, 119

[56] References Cited

U.S. PATENT DOCUMENTS 3,389,131  6/1968  Van Horn ............................ 260/119
4,407,747  10/1983  Lippe et al. ......................... 260/120

Primary Examiner—Howard E. Schain
Attorney, Agent, or Firm—K. H. Boswell

[57] ABSTRACT

A hydrolyzed protein based on casein is prepared utilizing a process wherein casein as a solid is treated with sodium or potassium hydroxide in the presence of a limited amount of water. The amount of water utilized is insufficient to solubilize the casein such that at all times the casein and/or the hydrolyzed protein produced therefrom is present as a solid in an appropriate reaction vessel. The hydrolyzed protein is used as an additive to certain flesh containing food items as for instance seafood type products.

24 Claims, No Drawings

HYDROLYZED PROTEIN COMPOSITION AND PROCESS USED IN PREPARATION THEREOF

CROSS REFERENCE TO RELATED APPLICATIONS

This application is a continuation in part of my application Ser. No. 404,049 filed Aug. 2, 1982, and entitled Composition and Process Used in Preparing Canned Tuna, which in turn was a continuation in part of my application Ser. No. 179,771 filed Aug. 20, 1980 and entitled Composition and Process Used in Preparing Canned Tuna which issued as U.S. Pat. No. 4,363,820. The entire contents of both applications Ser. Nos. 404,049 and 179,771 are herein incorporated by reference.

BACKGROUND OF INVENTION

This invention is directed to a hydrolyzed protein composition and a process used in preparing that composition. The composition is useful as an additive to certain food products such as tuna flesh and the like. The composition is prepared from casein, utilizing an alkali hydroxide hydrolysis in the presence of a limited amount of water.

Can seafood products such as tuna, shrimp and crab, when sold in this country, must be processed under certain strict guidelines set forth by the FDA. These guidelines include the grating of the seafood product according to particle size of the flesh, the color of the flesh and the addition of additives to the product as well as other criteria. Further, for different size cans of the product, the amount of flesh in the can making up the contents of the can is also governed.

Allowable as additives to the canned seafood product are certain levels of sodium chloride, monosodium glutamate, hydrolyzed protein, spices and/or oils. Certain of these ingredients tend to interact with the flesh of the seafood product to alter the flavor and/or physical properties of the product. Hydrolyzed protein may be added to the can in order to bind smaller particles of the flesh into a more coherent mass. Economics preclude the addition of more costly protein than the actual protein of the seafood product. For this reason heretofore the hydrolyzed protein generally used in the processing of seafood products are of vegetable origin. Typically these would be vegetable broths of beans, cabbage, carrots, etc.

In adding hydrolyzed protein to seafood products the modification of certain properties such as binding small articles into a more coherent mass is desirable. However, the modification of other properties such as totally changing the flavor of the product is undesirable. No one wants canned shrimp to taste like carrots.

It is desirable, however, to eliminate certain objectionable rancid-like flavors which can be associated with several varieties of canned or precooked seafood products. If this can be achieved a cleaner taste will result with the natural flavor of the product present, however, the objectionable overpowering, rancid-like flavor eliminated.

BRIEF SUMMARY OF THE INVENTION

In view of the above, it is a broad object of this invention to provide for a composition which can be added to certain food products which will improve certain physical characteristics of these products. It is a further object of this invention to provide for a process for the preparation of such composition. Additionally it is an object of this invention to provide a composition which when added to a food product will result in the retention of certain natural and/or processing liquids, will reduce or eliminate certain overpowering rancid-like flavors and certain metallic tastes which can result from the canning process.

These and other objects are achieved in a hydrolyzed protein composition derived from casein which exhibits an increase in the levels of non-protein nitrogen compared to those found in casein. This increase indicates higher levels of free amino acids and the presence of very short chain peptides compared to those found in unreacted casein. Further, the composition exhibits a large increase with respect to the presence of terminal amino groups compared to those found in casein. Because of these and other factors, electrophoretic analysis of the composition of this invention compared to casein as a control shows additional bands present in the composition of this invention compared to that of the controlled casein. Optical rotation of both the composition of this invention and of casein shows a difference between the composition of this invention and casein.

Further, these objects are achieved in a process for preparing a hydrolyzed protein from casein which comprises locating a quantity of acid precipitated casein as a solid in a reaction vessel, locating a quantity of a compound chosen from the group consisting of sodium hydroxide and potassium hydroxide in said reaction vessel, locating a quantity of water in said reaction vessel, said quantity of water insufficient to solubilize said casein such that said casein is present in said reaction vessel as a solid, stirring the solid contents of said reaction vessel, discharging said contents of said reaction vessel as a solid by removing said solid contents from said reaction vessel.

Additionally, these objects are achieved in a process for preparing a hydrolyzed protein from casein which comprises locating the quantity of acid precipitated casein as a solid in a reaction vessel, locating a quantity of a compound chosen from the group consisting of sodium hydroxide and potassium hydroxide in said reaction vessel by solubilizing said compound in an amount of water, said amount of water insufficient to solubilize said casein when added to said reaction vessel, said quantity of said compound sufficient to raise the pH of said reaction vessel to at least pH 10 upon the addition of said compound, stirring the contents of said reaction vessel, discharging said contents of said reaction vessel as a solid by removing said solid contents from said reaction vessel.

Also, these objects are achieved in an edible solid composition of matter derived from casein by alkali hydrolysis of casein which comprises a quantity of acid precipitated casein, a quantity of a compound selected from the group consisting of sodium hydroxide and potassium hydroxide, a quantity of water, said compound present in an amount less than 5 percent by weight of the total weight of said composition and said water present in an amount from about 10 percent to about 20 percent by weight of the total weight of said composition, and where said composition includes an increased amount of ammoniacal nitrogen as compared to casein.

The composition of this invention exhibits the presence of free amino acids whereby casein does not. Further, the composition exhibits an increase in ammonia nitrogen compared to casein. The titratable alkalinity of the composition differs from that of casein. Also, structural differences are evident on a microscopic comparison of the composition with that of casein.

The process for preparing the composition utilizes alkali as a reactant. However, the composition produced by this process differs from alkali caseinates such as sodium caseinate. The viscosity of the composition is significantly increased compared to that of sodium caseinate.

DETAILED DESCRIPTION OF THE INVENTION

It is a common accepted biochemical principle that animal derived protein is of a generally superior nature compared to vegetable derived protein. It is also an ecological principle that animal derived protein requires more energy input to be synthesized and thus is economically more expensive than vegetable derived protein. As a filler, carrier, and/or binder, vegetable protein is generally therefore used, the economic principle being superior to the nutritional principle. Hydrolyzed protein is an acceptable additive to canned seafood products and other food products.

In certain areas of the world there is an excess of cow's milk available beyond that which is consumed by the local population. This excess of milk can be utilized prior to spoilage by dehydrating the same to form powdered milk, or by separation of the milk components. One of these components is casein.

Casein is the principal protein of bovine milk. By acidification to pH 4.7, casein can be isoelectrically precipitated out of solution. This is sometimes done by using in situ bacterial produced lactic acid. The acid precipitated caseins are very cationic in nature. Generally during the production of acid precipitated casein an anhydrous product is not achieved. Instead a product is isolated which retains roughly 9 or 10 percent of water. This percentage of water has been found not to be detrimental to the practice of this invention.

I have found that by treating acid precipitated casein with sodium or potassium hydroxide in the presence of the limited amount of water, that the cationic nature of the casein is changed and the casein is modified such that it has properties which are superior to the properties of vegetable derived proteins for use in the processing and production of canned seafood products. After so treating the casein with the alkali hydroxide, the resulting treated casein does not exhibit certain properties of untreated casein such as the ability to be precipitated at high temperatures. Further, the treated casein shows a partial anionic character when subjected to an electrophoresis at high pH as well as changes in the amount of protein nitrogen compared to casein which has not been treated with alkali hydroxide.

Casein can be solubilized by the neutralization of the acid precipitated casein with an alkali such as sodium hydroxide to form a soluble salt such as sodium caseinate. In forming sodium caseinate, essentially all that is done is simply neutralization of the casein with a limited amount of alkali. The sodium caseinate so formed is utilized in many "artificial dairy products". It is important in these products that the milk like flavors which are contributed by the casein itself are retained. Anything which tends to modify the sodium caseinate away from the flavor of the original casein is considered detrimental in that it will impart undesirable flavor characteristics to the final products which are based on sodium caseinate. The hydrolyzed protein composition of my invention differs significantly in a subjective manner from sodium caseinate. Whereas with sodium caseinate it is desirable not to amend the flavor characteristics of the sodium caseinate from that of casein itself, with the hydrolyzed protein composition of my invention different flavor characteristics are achieved. My hydrolyzed protein composition when tasted as an individual entity actually exhibits a very bitter ammonia like taste. Simply, the subjective taste alone shows that the hydrolyzed protein composition of my invention is significantly different from sodium caseinate. I have found, however, that even though this composition in itself exhibits very bitter ammonia like flavors, when added to other food products containing flesh, such as seafood flesh or the like, the bitter ammonia like taste of my composition is lost and also the flavor of the food product is improved by reducing certain rancid like flavors from the food product. In essence, while the seafood flesh product by itself may exhibit a rancid like flavor and the hydrolyzed protein composition of my invention by itself may exhibit a very bitter flavor, when combined the rancid like flavor of the seafood product and the bitter flavor of my composition are lost and the combination exhibits improved flavor characteristics as well as other beneficial characteristics including adhering of the particles of flesh into a more coherent mass and the like.

The presently preferred process for preparing the composition of the invention utilizes acid precipitated casein as a starting product. The acid precipitated casein is treated with an alkali hydroxide preferably sodium or potassium hydroxide in the presence of a limited amount of water since the alkali hydroxide treatment is carried out in the presence of only a limited amount of water, the casein does not simply go into solution and form an alkali caseinate as for instance sodium caseinate. Instead a true hydrolysis reaction of the casein is achieved to produce a hydrolyzed protein product significantly different from alkali caseinate and from casein itself.

Currently as practiced the process utilizes acid precipitated casein which can contain a small amount of water as for instance 9 to 10 percent. It is not necessary to dry the acid precipitated casein to yield an anhydrous product prior to utilizing the acid precipitated casein in the preferred process of the invention. Because the acid precipitated casein does not need to be dried, an energy intensive drying step is eliminated. This results in greater overall economics for the preferred process of producing the hydrolyzed protein composition of the invention.

Additionally, as will be evidenced below, the final hydrolyzed protein composition also does not need to be subjected to a drying step which further contributes to the economics of the process. The elimination of drying of both the starting material and final product leads to an increased usefulness of the hydrolyzed protein composition in the market place in so far as it is an additive for food stuffs and the like whose ultimate cost must be borne by the consumer. When the hydrolyzed protein composition of the invention is added to a foodstuff as for instance a seafood based product, it renders certain properties to the foodstuff which neither casein nor sodium caseinate are capable of doing.

As is indicated in the examples below, acid precipitated casein containing a small percentage of water as for instance from about 9 to about 10 percent is placed in a reaction vessel. The reaction vessel includes a stirrer which is capable of stirring the solid casein.

Suitable as a reaction vessel would be a blender capable of producing a high shear. The acid precipitated casein is added as a solid to the reaction vessel and a solid is present at all times during the reaction. The casein is not taken up into solution such that an alkali caseinate solution would be formed in the reaction vessel.

The solid acid precipitated casein containing a limited amount of moisture therein is stirred within the reaction vessel and an alkali hydroxide preferably sodium hydroxide is added preferably as a very concentrated solution to the reaction vessel. The amount of water utilized for the alkali hydroxide solution for addition to the reaction vessel is insufficient to solubilize the acid precipitated casein located in the reaction vessel. Therefore at all times the acid precipitated casein and/or the hydrolyzed product being produced therefrom is present as a solid in the reaction vessel. Normally a very concentrated solution of alkali hydroxide would be used as for instance a 50 percent of sodium hydroxide in water. This is insufficient to solubilize the casein.

As was noted in the preceeding sentence, the alkali hydroxide can be added as a very concentrated solution. It is not mandatory however to use a solution form of the alkali hydroxide. The alkali hydroxide can be added to the blender holding the casein by adding the alkali hydroxide as a dry product. If the alkali hydroxide is added in this form, small amounts of water are then added. If the alkali hydroxide is added as a solution, preferably it will be a concentrated solution as for instance a 50 or 60 percent solution. The solution however can be diluted to a certain extent to about a 25 percent solution. In any event, the totality of the water, when all sources are considered, i.e. any water on the starting acid precipitated casein, any water utilized to form a solution with the alkali hydroxide or any water added as a separate component to the reaction vessel, will never exceed about 20 percent. Normally a lesser percentage of water, as for instance 17 percent, will be utilized. Additionally, since this is a hydrolysis reaction, some water must be present. Of the total weight of all of the reactants, water at a minimum would be about 10 percent. The source of this water, however, might be variable. If anhydrous casein is utilized, then all of the water might be added in the form of the alkali hydroxide solution. If anhydrous casein and dry alkali hydroxide were utilized, the minimum of water would be added as a separate reactant. If casein containing about 9 or 10 percent water, the normal amount usually found in acid precipitated casein which has not been subjected to drawing, is utilized, then additional water above that of the minimum would be utilized either as water solution for the alkali hydroxide solution or as added water if dry alkali hydroxide is added to the reaction vessel. In any event, however, the maximum amount of water would be within the limits discussed above.

In any event, because water will only be present up to about 20 percent of the totality of the reactants in the reaction vessel i.e. the acid precipitated casein, the alkali hydroxide and the water, at all times the acid precipitated casein and/or the hydrolyzed protein derived therefrom will be present in the solid phase. Because of the presence of either the acid precipitated casein and/or the hydrolyzed protein in the solid phase it is preferably to insure that stirring is continued during the reaction. This is best achieved in a high shear blender as noted above.

The reaction between the alkali hydroxide and the acid precipitated casein is an exothermic reaction. Because of this no additional heating during the reaction is necessary. Optionally, however, the reaction vessel can be cooled to remove some of the heat from the exothermic reaction. This is conveniently done by utilizing a jacketed reaction vessel. While cooling can be effected, it is not required for the reaction to proceed.

The alkali hydroxide is normally used in concentrations up to about 5 percent by weight for the total combined weight of all the reactants i.e. alkali hydroxide, the acid precipitated casein and the water. Initially upon the addition of the alkali hydroxide, the pH of the reaction vessel increases rapidly to pH 10 or greater. It has been found that essentially as the pH goes up, certain properties of the composition produced by the reaction improve. As such the pH can be run at pH 10 or higher with pH's of 11 or higher normally being present upon the initial addition of the alkali hydroxide to the reaction vessel.

As noted above, up to a 5 percent alkali hydroxide concentration based on the weight of the alkali hydroxide compared to the total weight of the reaction mixture is normally used. Higher alkali hydroxide concentrations could be utilized. However, in actual production of the hydrolyzed protein composition of the invention, it has been found that by increasing the alkali hydroxide concentration the reaction tends to be prolonged which increases the use of equipment and labor. Because additional alkali hydroxide also constitutes a further economic consideration when this is added to the economic consideration of prolonged use of labor and equipment, it is considered that the 5 percent level of alkali hydroxide is the preferred upper limit for practical purposes. Of course it is realized that for noncommercial processes wherein the economic considerations of the reactions are not so critical, higher concentrations of alkali hydroxide might also be used.

The following illustrative examples for the preparation of the hydrolyzed protein composition of the invention are given. In each of these examples at all times the acid precipitated casein and/or the hydrolyzed protein composition produced therefrom is present in the solid phase and at no time is solubility achieved within the reaction vessel. Because of the presence of the solid phase and because of the high alkalinity of the reaction vessel i.e. pH 10 or above, sodium caseinate is not produced but in fact an alkali hydrolyzed protein having characteristics as are defined below is achieved.

EXAMPLE 1

689 lbs. of acid precipitated casein was placed in a blender capable of producing a high shear. 100 lbs. of a 60% solution of sodium hydroxide at a starting temperature of 55° F. was injected into the blender with stirring. After mixing for two minutes, it was noted that the pH of the blender contents was approximately 12. After approximately ten minutes of stirring, the reaction temperature had increased to 80° F., and after 45 minutes it was 100° F. The reaction was judged complete after 45 minutes. Initially, stirring was very easy, and at the completion of the reaction a powder having good pouring properties resulted. It was calculated that this powder contained 17% moisture, based on an approximate 10% moisture level in the starting casein.

EXAMPLE 2

In this example, reaction conditions were as described in Example 1 above. 689 lbs. of casein was treated with 65 lbs. of a 60% solution of sodium hydroxide solution. Initial reaction temperature was 60° F. and after 40 minutes of stirring it had climbed to 105° F. A pH of 10.33 was measured after several minutes of stirring. As above, a flowable powder was produced.

EXAMPLE 3

In this example, reaction conditions were as described in Example 1 above. 689 lbs. of casein was treated with 44 lbs. of 60% sodium hydroxide solution. Initial temperature measurement of 60° F. resulted, with a 90° F. temperature reading at the conclusion of the reaction, calculated to be forty minutes. The pH after several minutes of stirring was approximately pH 10. The reaction mixture of this example was more viscous than in Examples 1 and 2 above.

In the above examples, the reactions all were exothermic reactions. Swelling of the solid phase materials in the blender was noticed as the reaction proceeded. Upon completion of the reaction, the solid phase material collapsed to a certain degree to indicate the conclusion of the reaction. Also very evident during the progress of the reaction was an ammoniacal odor. As will be noted from certain characteristics below, free ammonia is released during the hydrolysis of the acid precipitated casein in the preparation of the hydrolyzed protein composition of the invention. The ammoniacal odor during the reaction phase indicates the reaction is proceeding even though at all times a solid phase is present. The exothermic nature of the reaction and the swelling of the products in the reaction vessel also are indicators of the progress of the reaction.

The hydrolyzed protein as produced by the above examples was compared to lactic acid precipitated casein. The crude protein for both the lactic acid casein and the hydrolyzed protein was analyzed utilizing Kjeldahl nitrogen as a parameter. It was found that the lactic acid precipitated casein exhited 83.31 percent crude protein by this method compared to 66.43 percent for the hydrolyzed protein composition of the invention. Further total amino nitrogen as determined by the Sorenson Titration method showed 1.7 percent for the lactic acid precipitated casein and an increase of over four-fold to 6.73 percent for the hydrolyzed protein composition of the invention.

Nonprotein nitrogen was also analyzed. In this analysis, casein was shown to have 0.29 percent nonprotein nitrogen where as the hydrolyzed protein composition of the invention showed on the average 0.365 percent nonprotein nitrogen. Further in this test the casein exhibited 83.77 percent total protein whereas the hydrolyzed protein composition of the invention showed a drop in total protein to 63.5 percent in one sample and 60.8 percent in a further sample.

An electrophoresis was run on polyacrylamide gels. In a casein control there were no bands evident in the kappa casein region during this test whereas for the hydrolyzed protein composition of the invention two bands were present in the kappa casein region.

The specific rotation of a 14 percent solution of casein was compared to that of a 14 percent solution of the hydrolyzed protein composition of the reaction. The $a_D{}^{25}$ of the casein solution was minus 32° in ammonia. That of the hydrolyzed protein composition of the invention was minus 15° in ammonia. In so far as in the ammonia solution the casein would be as an ammonium salt essentially this comparison could be considered to be between a caseinate salt and the hydrolyzed protein composition of the invention.

Samples of both casein and the hydrolyzed protein composition of the invention were analyzed for ammonia nitrogen content using the test procedure of AOAC method 7.033, Thirteenth Edition. The casein was found to have 0.16 percent ammoniacal nitrogen and the hydrolyzed protein composition of the invention 1.38 percent ammonia nitrogen. As was noted above in the examples for preparation of the hydrolyzed protein of the invention, an ammoniacal odor is noted during the reaction. This is borne out by the ammonia nitrogen analysis noted.

The peptide content of the hydrolyzed protein composition of the invention is at least two-fold greater than that of casein as determined by an Edmon Degradation. Further, Chromatographic analysis utilizing AG2-X8 ion exchange resin showed sufficiently different peaks between that of casein and the hydrolyzed protein composition of the invention. Amino acid analysis of casein compared to the hydrolyzed protein composition of the reaction shows the following values.

|  | Casein | Hydrolyzed Protein |
|---|---|---|
|  | nM/mg | |
| Alanine | 3.1 | 9.1 |
| Aspartic acid | 3/0 | 7.6 |
| Glutamic acid | 10.0 | 22.0 |
| Isoleucine | 2.6 | 3.3 |
| Leucine | 3.7 | 5.1 |
| Lysine | 12.0 | 18.0 |
| Proline | 13.0 | 37.0 |
| Tyrosine | 2.5 | 3.3 |
| Valine | 5.5 | 6.3 |

The titratable alkalinity of the hydrolyzed protein composition of the reaction compared to casein also differs. Casein showed 0 percent sodium hydroxide titratable alkalinity whereas the hydrolyzed protein composition showed 1.83 percent sodium hydroxide titratable alkalinity.

The viscosity of the hydrolyzed protein composition of the invention was compared to a commercial sample of sodium caseinate. Utilizing the Brookfield viscosity as an indicator. Sodium caseinate showed a value of 0.48 cps whereas the hydrolyzed protein composition of the invention showed a three-fold increase of the viscosity of 1.68 cps. Both of these samples were tested as 10 percent solutions.

I claim:

1. An exothermic process performed in the absence of an addition of heat for preparing a hydrolyzed protein from casein and wherein said hydrolyzed protein is not sodium or potassium caseinate which comprises:
    locating a quantity of acid precipitated casein as a solid in a reaction vessel;
    locating a quantity of a compound chosen from the group consisting of sodium hydroxide and potassium hydroxide in said reaction vessel;
    locating a quantity of water of at least 10% by weight of the total contents of the reaction vessel in said reaction vessel, said quantity of water insufficient to solubilize said casein such that said casein is present in said reaction vessel as a solid;

stirring the solid contents of said reaction vessel for at least 2 minutes so as to initiate the release of an ammoniacal odor from said solid contents of said reaction vessel;

discharging said contents of said reaction vessel as a solid by removing said solid contents from said reaction vessel.

2. The process of claim 1 wherein:
said water is present by weight not exceeding 18 percent of the total contents of said reaction vessel.

3. The process of claim 1 wherein:
a portion of said water is contained on said acid precipitated casein prior to the addition of said acid precipitated casein to said reaction vessel.

4. The process of claim 1 wherein:
said compound is present in an amount not exceeding 5 percent of the total weight of the contents of said reaction vessel.

5. The process of claim 1 wherein:
said compound is added to said reaction vessel in solution in at least a portion of said water.

6. The process of claim 5 wherein:
said solution of said compound in said portion of said water is at least a 25 percent solution of said compound in said portion of said water.

7. The process of claim 6 wherein:
a further portion of said water is contained on said acid precipitated casein prior to addition of said acid precipitated casein to said reaction vessel.

8. The process of claim 1 wherein:
said reaction vessel includes cooling means to withdraw heat from said reaction vessel after the addition of said compound to said reaction vessel.

9. A process for preparing a hydrolyzing protein from casein wherein said hydrolyzed protein is not sodium or potassium caseinate which comprises:
locating a quantity of acid precipitated casein as a solid in a reaction vessel;
adding a water solution of a compound chosen from the group consisting of sodium hydroxide and potassium hydroxide to said reaction vessel, said water of solution of said compound insufficient to solubilize said casein when added to said reaction vessel, the quantity of said compound in said solution sufficient to raise the pH of said reaction vessel to at least pH 10 upon the addition of said compound;
stirring the contents of said reaction vessel to mix said solution of said compound and said casein;
discharging said contents of said reaction vessel as a solid by removing said solid contents from said reaction vessel.

10. The process of claim 9 wherein:
said casein is added to said reaction vessel as a solid containing water wherein the totality of said water on said casein and said water of solution of said compound is less than 20 percent by weight of the weight of the total contents of said reaction vessel.

11. The process of claim 10 wherein:
said compound is added in an amount less than 5 percent by weight of the total weight of the contents of said reaction vessel.

12. An edible solid composition of matter derived from casein by alkali hydrolysis of casein wherein said solid composition of matter is not an alkali metal caseinate which comprises:
a quantity of acid precipitated casein;
a quantity of a compound selected from the group consisting of sodium hydroxide and potassium hydroxide;
a quantity of water;
said compound present in an amount less than 5% by weight of the total weight of said composition and said water present in an amount from about 10% to about 20% by weight of the total weight of said composition;
and where said composition includes an increased amount of ammoniacal nitrogen as compared to casein and said composition has an anionic pH so as to render it with a bitter ammonia like flavor.

13. The composition of claim 12 wherein:
said composition exhibits a decreased amount of total protein compared to casein as determined by the Kjeldahl Nitrogen method and further shows an increase in the amount of nonprotein nitrogen compared to casein.

14. The composition of claim 12 wherein:
said composition exhibits about a four-fold increase in amino nitrogen as compared to casein as determined by a Sorenson Titration.

15. The composition of claim 12 wherein:
said composition exhibits an optical rotation of about $\alpha_D{}^{25} = -15°$ as a 14 percent solution in ammonia.

16. The composition of claim 12 wherein;
said composition contains at least twice the number of individual peptides as determined by an Edmon Degradation compared to casein.

17. The composition of claim 12 wherein:
said composition shows increased quantities of amino acids compared to casein as shown by Chromatographic analysis utilizing ion exchange resins.

18. The composition of claim 12 wherein:
said composition exhibits essentially a three-fold increase in viscosity as compared to sodium caseinate utilizing the Brookfield viscosity as an indicator.

19. The composition of claim 12 wherein:
said composition has a pH greater than pH 10.

20. The process of claim 1 wherein:
said solid contents of said reaction vessel are stirred for at least 10 minutes.

21. A process for preparing a hydrolyzed protein from casein wherein said hydrolyzed protein is not sodium or potassium caseinate which comprises:
locating a quantity of acid precipitated casein as a solid in a reaction vessel;
locating a quantity of a compound chosen from the group consisting of sodium hydroxide and potassium hydroxide in said reaction vessel, said quantity of said compound sufficient to raise the pH of the contents of said reaction vessel to at least pH 10;
locating a quantity of water of from about 10% to about 20% by weight of the total weight of the contents of said reaction vessel in said reaction vessel, said quantity of water insufficient to solubilize said casein such that said casein is present in said reaction vessel as a solid;
stirring the solid contents of said reaction vessel for at least 10 minutes;
discharging said contents of said reaction vessel as a solid by removing said solid contents from said reaction vessel.

22. The process of claim 21 wherein:
said water is present by weight not exceeding 18% of the total contents of said reaction vessel.

23. The process of claim 21 wherein:
said compound is added to said reaction vessel in solution in at least a portion of said water.

24. The process of claim 23 wherein:
said solution of said compound in said portion of said water is at least a 25% solution of said compound in said portion of said water.

\* \* \* \* \*

UNITED STATES PATENT AND TRADEMARK OFFICE
CERTIFICATE OF CORRECTION

PATENT NO. : 4,545,933

DATED : OCTOBER 8, 1985

INVENTOR(S) : JOHN H. ERNSTER

It is certified that error appears in the above-identified patent and that said Letters Patent is hereby corrected as shown below:

Column 2, Line 1, after the word "such" insert the word --a--.

Column 3, line 43, the first occurrence of the word "the" should be --a--.

Column 5, line 22, after the words "50 percent" insert the word --solution--.

Column 5, line 54, "drawing" should be --drying--.

Column 8, line 48, after the word caseinate, eliminate the punctuation "." and, further, the first letter of the next word "Utilizing" should be in the lower case as in --utilizing--.

Signed and Sealed this

Twenty-second Day of July 1986

[SEAL]

Attest:

DONALD J. QUIGG

Attesting Officer

Commissioner of Patents and Trademarks